United States Patent
Suh

(10) Patent No.: US 10,267,994 B2
(45) Date of Patent: Apr. 23, 2019

(54) WAVELENGTH SELECTIVE SWITCH INCLUDING A LIQUID CRYSTAL ON SILICON

(71) Applicant: InLC Technology, Inc., Gwangju (KR)

(72) Inventor: Seong Woo Suh, Budd Lake, NJ (US)

(73) Assignee: INLC TECHNOLOGY, INC., Gwanju (KR)

( * ) Notice: Subject to any disclaimer, the term of this patent is extended or adjusted under 35 U.S.C. 154(b) by 816 days.

(21) Appl. No.: 14/055,171

(22) Filed: Oct. 16, 2013

(65) Prior Publication Data
US 2014/0104560 A1 Apr. 17, 2014

Related U.S. Application Data

(60) Provisional application No. 61/714,449, filed on Oct. 16, 2012.

(51) Int. Cl.
*G02F 1/01* (2006.01)
*G02F 1/31* (2006.01)
(Continued)

(52) U.S. Cl.
CPC .......... *G02B 6/293* (2013.01); *H04Q 11/0005* (2013.01); *G02B 6/2931* (2013.01); *G02F 1/0136* (2013.01); *G02F 1/31* (2013.01); *G02F 2001/136281* (2013.01); *G02F 2201/17* (2013.01); *G02F 2201/34* (2013.01); *G02F 2203/055* (2013.01); *G02F 2203/07* (2013.01);
(Continued)

(58) Field of Classification Search
USPC ............... 349/129, 130, 196, 197, 201, 202; 398/48; 359/484.06, 487.04, 489.08, 303
See application file for complete search history.

(56) References Cited

U.S. PATENT DOCUMENTS 5,619,601 A * 4/1997 Akashi .................. G02B 27/28
    385/11
5,657,105 A   8/1997 McCartney ................... 349/157
(Continued)

OTHER PUBLICATIONS

Birendra Bahadur, Liquid Crystals Applications and Uses, 1990, World Scientific, vol. 1, pp. 171-194.*
(Continued)

*Primary Examiner* — Edward J Glick
*Assistant Examiner* — David Y Chung
(74) *Attorney, Agent, or Firm* — Stein IP, LLC

(57) ABSTRACT

A wavelength selective switch (WSS) apparatus is disclosed, which includes: a liquid crystal on silicon (LCOS) phase array configured for selectively diverting a certain wavelength component of light beams to continue to propagate and keeping another wavelength component of the light beams from propagating by controlling a voltage applied thereto and/or a polarization of the light beams, the LCOS phase array being provided with a first liquid crystal (LC) domain, a second liquid crystal (LC) domain, and a reflection component, the reflection component being configured to reflect a light beam input through the first LC domain back to the first LC domain and reflect a light beam input through the second LC domain back to the second LC domain; and a reflective element that is arranged to reflect the light beams output from the LCOS phase array back to the LCOS phase array.

20 Claims, 5 Drawing Sheets

(51) Int. Cl.
*G02B 6/293* (2006.01)
*H04Q 11/00* (2006.01)
*G02F 1/1362* (2006.01)

(52) U.S. Cl.
CPC .. *G02F 2203/58* (2013.01); *H04Q 2011/0026* (2013.01); *H04Q 2011/0035* (2013.01); *H04Q 2213/13003* (2013.01)

(56) References Cited

U.S. PATENT DOCUMENTS

| | | | |
|---|---|---|---|
| 6,556,320 B1 | 4/2003 | Cao | 359/122 |
| 6,606,143 B1* | 8/2003 | Yamahara | G02F 1/133632 349/117 |
| 6,766,081 B2 | 7/2004 | Weaver et al. | 385/39 |
| 6,778,251 B1* | 8/2004 | Austin | G02F 1/133382 349/139 |
| 7,092,599 B2 | 8/2006 | Frisken | 385/37 |
| 2005/0036202 A1* | 2/2005 | Cohen | G02B 6/272 359/484.05 |
| 2005/0100277 A1* | 5/2005 | Frisken | G02B 6/2931 385/37 |
| 2005/0146662 A1* | 7/2005 | Inoue | G02F 1/134363 349/129 |
| 2008/0129911 A1* | 6/2008 | Huang | G02F 1/136209 349/44 |
| 2008/0316585 A1* | 12/2008 | Cohen | G02B 6/2713 359/303 |
| 2009/0237785 A1* | 9/2009 | Bloom | G02B 27/286 359/485.05 |
| 2011/0085222 A1* | 4/2011 | Komiya | G02B 6/272 359/223.1 |

OTHER PUBLICATIONS

Rafik Ward, "Why Use LCoS in a Wavelength Selective Switch?", http://www.finisarlightspeed.com/why-use-lcos-in-a-wavelength-selective-switch/.*

U.S. Appl. No. 61/714,449, filed Oct. 16, 2012, Seong Woo Suh.

* cited by examiner

WAVELENGTH SELECTIVE SWITCH INCLUDING A LIQUID CRYSTAL ON SILICON

CROSS-REFERENCE TO RELATED APPLICATIONS

This application is a non-provisional application of U.S. Provisional Application No. 61/714,449, filed Oct. 16, 2012 in the U.S. Patent and Trademark Office. All disclosures of the document(s) named above are incorporated herein by reference.

BACKGROUND OF THE INVENTION

1. Field of the Invention

The present subject matter relates generally to a wavelength selective switch (WSS) including a two-dimensional liquid crystal device such as a liquid crystal on silicon (LCOS), polysilicon, or an amorphous silicon backplane, and more specifically, to a WSS including an LCOS configured for use in an optical communication system.

2. Description of the Related Art

In optical communications systems, the use of wavelength selective switching for applications of optical cross-connects has attracted much interest because of the goal of fully flexible, networks where the paths of each wavelength can be reconfigured to allow arbitrary connection between nodes with the capacity appropriate for that link at a particular point in time.

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system. There is a need in such systems to switch packets of optical information passing along one fiber to any of a number of other fibers, according to the wavelength of the optical signal. Such a switch is known as an optical router or a wavelength selective switch. A number of wavelength dependent switches and routers exist in the prior art. For example, U.S. Pat. No. 7,092,599 to S. J. Frisken for "Wavelength Manipulation System and Method" describes a wavelength manipulation system using an LCOS phased array, with an optical arrangement including a spherical mirror and a cylindrical lens for maintaining collimation of the input beams in the direction of dispersion, and for focusing of the input beams in the direction perpendicular to the direction of dispersion. Also, in U.S. Patent Application Publication No. 2008/0316585 to G. Cohen et al. for "Optical Wavelength Selective Router," there is described a fiber-optical, multi-way, wavelength selective switch (WSS) structure, such as is used for channel routing and/or blocking applications in optical communication and information transmission systems.

SUMMARY OF THE INVENTION

An aspect of the present subject matter is directed to a wavelength selective switch (WSS) apparatus comprising: a liquid crystal on silicon (LCOS) phase array configured for selectively diverting a certain wavelength component of light beams to continue to propagate and keeping another wavelength component of the light beams from propagating by controlling a voltage applied thereto and/or a polarization of the light beams, the LCOS phase array being provided with a first liquid crystal (LC) domain, a second liquid crystal (LC) domain, and a reflection component, the reflection component being configured to reflect a light beam input through the first LC domain back to the first LC domain and reflect a light beam input through the second LC domain back to the second LC domain; and a reflective element that is arranged to reflect the light beams output from the LCOS phase array back to the LCOS phase array.

In the WSS apparatus according to an aspect of the present subject matter, the first LC domain is configured to change a polarization of light beams through the course of the input of the light beams to the first LC domain, the reflection of the light beams by the reflection component, and the output of the light beams from the first LC domain, and the second LC domain is configured to maintain a polarization of light beams through the course of the input of the light beams to the second LC domain, the reflection of the light beams by the reflection component, and the output of the light beams from the second LC domain.

In the WSS apparatus according to an aspect of the present subject matter, the first LC domain includes first liquid crystals that are oriented in a first direction and the second. LC domain includes second liquid crystals that are oriented in a second direction, the second direction being different from the first direction.

In the WSS apparatus according to an aspect of the present subject matter, the second direction is substantially in line with the polarization of the light beams input to the second LC domain and the first direction is substantially 45° with respect to the second direction.

In the WSS apparatus according to an aspect of the present subject matter, the LCOS phase array further includes a substrate on which rubbing directions are provided, and the first direction of the first liquid crystals and the second direction of the second liquid crystals are substantially in line with rubbing directions of corresponding parts of the substrate.

In the WSS apparatus according to an aspect of the present subject matter, the first LC domain includes a waveplate and first liquid crystals that are oriented in a first direction, and the second LC domain includes second liquid crystals that are oriented in a second direction, the second direction being the same as the first direction.

In the WSS apparatus according to an aspect of the present subject matter, the LCOS phase array further comprises: a third liquid crystal (LC) domain provided between the first and second LC domains, the third LC domain including third liquid crystals that are oriented in a third direction, the third direction being substantially the same as the second direction, the reflection component is further configured to reflect a light beam input through the third LC domain back to the third LC domain.

In the WSS apparatus according to an aspect of the present subject matter, the LCOS phase array further comprises: a third liquid crystal (LC) domain provided between the first and second LC domains, the third LC domain including third liquid crystals that are oriented in a third direction, the third direction being different from the first and second directions, the reflection component is further configured to reflect a light beam input through the third LC domain back to the third LC domain.

In the WSS apparatus according to an aspect of the present subject matter, the third direction is substantially 90° with respect to the second direction.

The WSS apparatus according to an aspect of the present subject matter, further comprises: a grating element that is located before the LCOS phase array with respect to input light beams and located after the LCOS phase array with respect to output light beams, the grating element being configured to disperse wavelength components of the input light beams in a same plane.

The WSS apparatus according to an aspect of the present subject matter, further comprises: a plurality of optical fibers from which the input light beams are propagated to the grating element and to which the output light beams are propagated from the grating element.

In the WSS apparatus according to an aspect of the present subject matter, the plurality of optical fibers are arranged so that different wavelength components of the output light beams enters into different optical fibers.

In the WSS apparatus according to an aspect of the present subject matter, each of the first LC domain and second LC domain in the LCOS phase array includes multiple LC cells.

The WSS apparatus according to an aspect of the present subject matter, further comprises: a beam expansion member on a light path between the plurality of optical fibers and the grating element, the beam expansion member being configured for expanding light beams therethrough; a first focusing member on a light path between the grating element and the LCOS phase array, the first focusing member being configured for focusing light beams therethrough; and a second focusing member on a light path between the LCOS phase array and the reflective element, the second focusing member being configured for focusing light beams therethrough.

A method of wavelength selective switching of light beams according to an aspect of the present subject matter is directed to transmitting a light beam from a plurality of optical fibers to a liquid crystal on silicon (LCOS) phase array, the LCOS phase array including a first liquid crystal (LC) domain and a second liquid crystal (LC) domain; reflecting the light beam by the second LC domain of the LCOS phase array to a reflective element, a polarization of the light beam remaining unchanged after the reflection by the second LC domain of the LCOS phase array; reflecting the light beam by the reflective element back to the LCOS phase array; reflecting the light beam reflected from the reflective element back to the reflective element, by the first LC domain of the LCOS phase array, the polarization of the light beam being changed after the reflection by the first LC domain of the LCOS phase array; and reflecting the light beam reflected from the first LC domain of the LCOS phase array by the reflective element.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present subject matter will become apparent and more readily appreciated from the following description of the embodiments, taken in conjunction with the accompanying drawings of which.

DETAILED DESCRIPTION OF THE EMBODIMENTS

Figure 1:
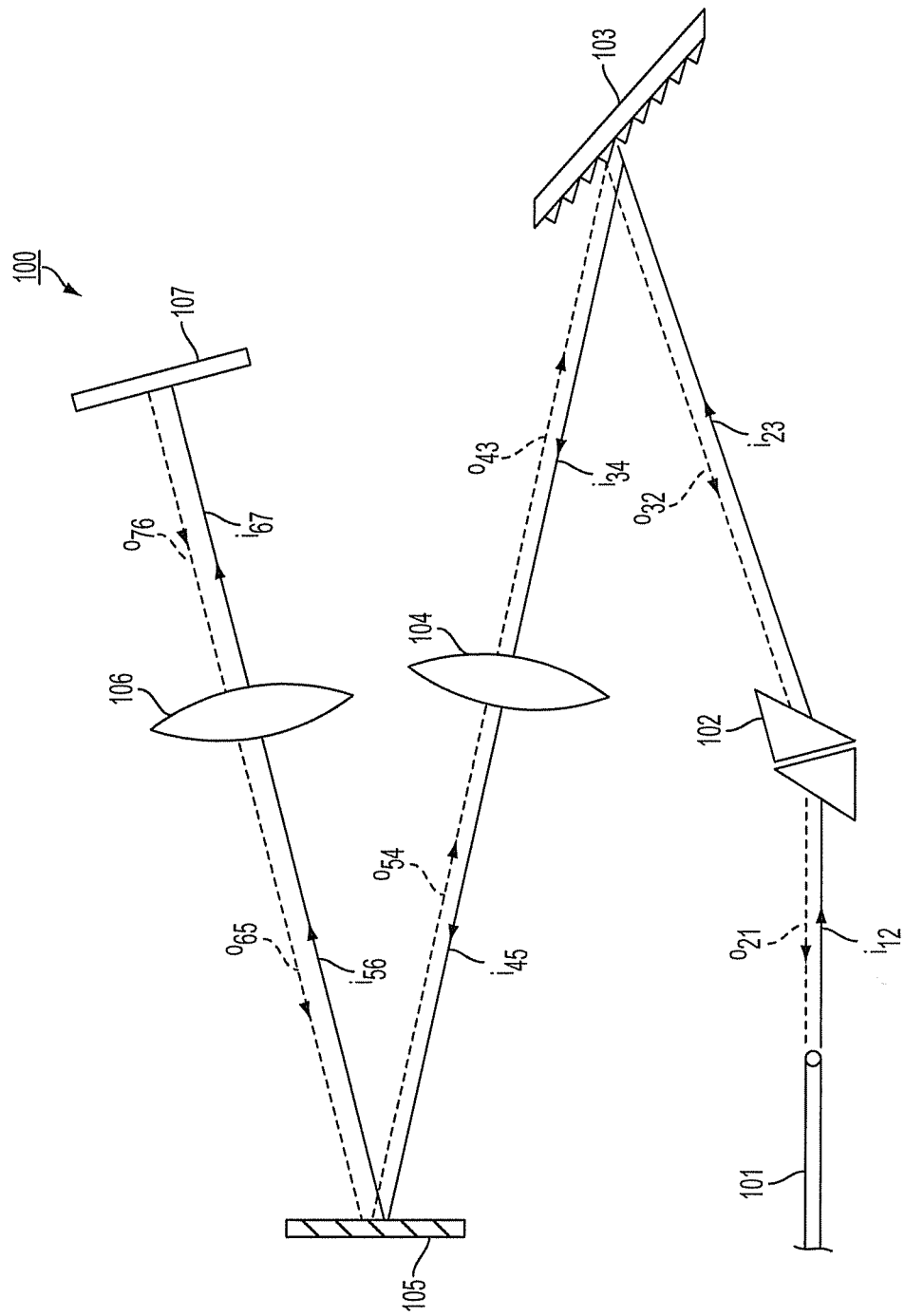
FIG. 1 is a schematic top plan view of a wavelength selective switch (WSS) structure using a liquid crystal on silicon (LCOS) phase array according to an embodiment of the present subject matter.

Reference will now be made in detail to embodiments of the present subject matter, examples of which are illustrated in the accompanying drawings, wherein like reference numerals refer to the like elements throughout. The embodiments are described below in order to explain the present subject matter by referring to the figures.

FIG. 1 is a schematic top plan view of a wavelength selective switch (WSS) structure 100 using a liquid crystal on silicon (LCOS) phase array according to an embodiment of the present subject matter. In FIG. 1, an array of optical input and output fibers 101 are provided, which are arranged in a vertical plane, i.e., the plane orthogonal to the drawing paper. Initial light beams $i_{12}$ are emitted from an input fiber of the fibers 101 to a beam expansion member 102. Here, the beam expansion member 102 can be prisms, a cylindrical lens, or the like. The expanded beams $i_{23}$ are generated by the beam expansion member 102 and then are directed to a grating element 103, which disperses the wavelength components of each input beam $i_{23}$ in the same plane as that in which the beams were generated and expanded in the horizontal on the paper plane. A focusing lens 104 receives the diffracted beam $i_{34}$ input from the grating element 103, and then focuses the separated wavelength components $i_{45}$ onto an LCOS phase array 105, which will be shown in more detail in the following drawings. The LCOS phase array 105 can selectively divert a certain wavelength component to continue to propagate while prohibiting another wavelength component to do so by controlling the voltage applied thereto and/or the polarization of light. The beams $i_{56}$ output from the LCOS phase array 105 propagates to a reflective element 107 through a second lens 106. The reflective element 107 can be a flat or spherical mirror, which reflects the input beams $i_{67}$ to the output beams $o_{76}$ towards the second lens 106, which in turn generates focused beams $o_{65}$ to the LCOS phase array 105.

On the LCOS phase array 105, the incident beams $o_{65}$ may experience another reflection in the direction slightly different from that of the beam $i_{56}$. In this way, the beams may be reflected multiple times between the LCOS phase array 105 and the reflective element 107, thereby allowing a smooth control of the angle of the output beams $o_{65}$.

Figure 2A:
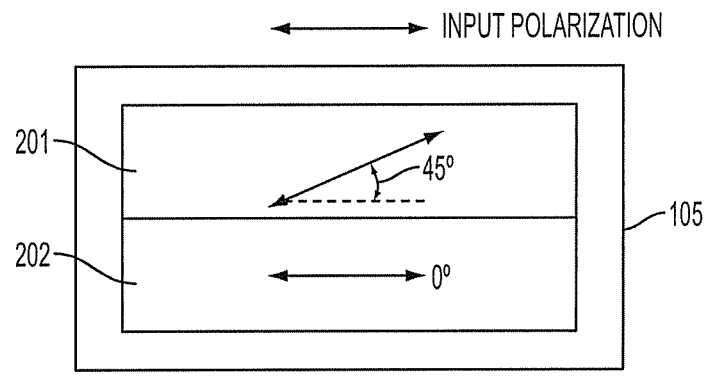
FIG. 2A is a front view of an LCOS phase array according to an embodiment of the present subject matter.
Figure 2B:
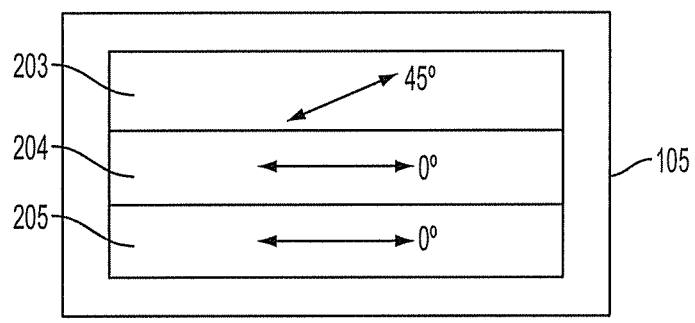
FIG. 2B is a front view of an LCOS phase array according to another embodiment of the present subject matter.
Figure 2C:
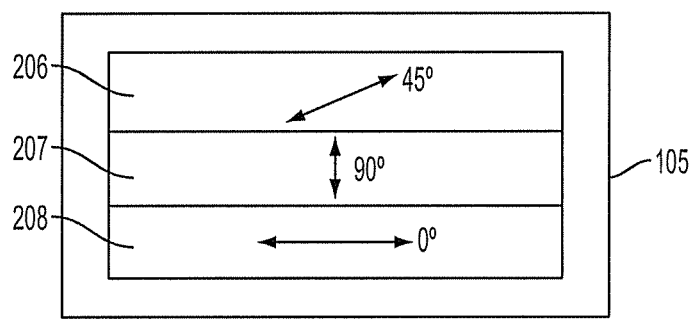
FIG. 2C is a front view of an LCOS phase array according to still another embodiment of the present subject matter.

FIG. 2A is a front view of an LCOS phase array according to an embodiment of the present subject matter; FIG. 2B is a front view of an LCOS phase array according to another embodiment of the present subject matter; and FIG. 2C is a front view of an LCOS phase array according to still another embodiment of the present subject matter. Here, it is assumed that the incident polarization is in horizontal direction.

Referring to FIG. 2A, a multi-domain LCOS phase array 105 has a first domain 201, including a plurality of cells (illustrated in FIG. 4) arranged in the horizontal direction, whose rubbing direction (orientation angle) is 45° with respect to the horizontal direction; and a second domain 202, including a plurality of cells arranged in the horizontal direction, whose rubbing direction is 0°, i.e., the horizontal direction. In this embodiment, the first domain 201 is neighboring to the second domain 202 and they are arranged in the vertical direction, i.e., 90° with respect to the horizontal direction.

Figure 5:
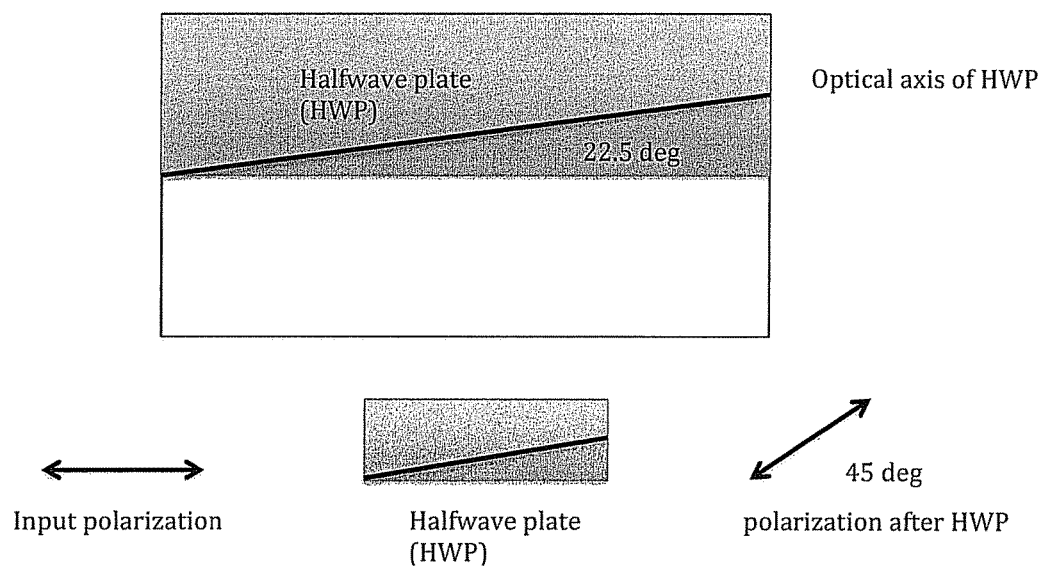
FIG. 5 is a front view of an LCOS phase array according to another embodiment of the present subject matter.

Multi-domain rubbing may be cumbersome in actual implementation. Instead of rubbing 45° in the first domain 201, we can change the polarization of input to 45° but still enjoy similar effects. FIG. 5 schematically shows this concept. To achieve this we can have 22.5° angle halfwaveplate similar devices in front of the first domain 201. In this case, the LCOS array 105 is rubbed in the same direction for all area.

The beams are first incident to the second domain 202 of the array 105 are reflected to the reflective element 107 at a different angle to the incident angle with respect to the front surface of the second domain 202, depending on the phase controlled by the voltage applied to the cells. By controlling the phase of the cells, the output beams can have a preferred output angle. In FIG. 2A, the beams output from the second domain 202 of the LCOS array 105 may be reflected by the reflective element 107 in a direction to the first domain 201 of the array 105. When the beams incident to the second domain 202 of the array 105, they will typically experience a saw tooth shape phase array whose height and periodicity are precisely controlled to steer the beam to the preferred direction. When beams incident to the first domain 201 of the array 105, they can be controlled by a constant voltage across the first domain 201 instead of by a saw tooth shape. The first domain 201, which has been rubbed in a direction of 45°, does not change the output angle of the beams but change their polarization, thereby changing the intensity of the beams by passing through polarizing component located at output fiber for the polarization diversity purpose. In this regard, the first domain 201 may be regarded as a polarization array since it changes the polarization of the incident beams while the second domain 202 may be regarded as a phase array since it changes the phase of the incident beams.

In contrast to the multi-domain LCOS phase array shown in FIG. 2A, the one 105 illustrated in FIG. 2B has three domains, namely, a first domain 203 whose rubbing direction is 45° with respect to the horizontal direction, a second domain 204 whose rubbing direction is 0° with respect to the horizontal direction, and a third domain 205 whose rubbing direction is 0° with respect to the horizontal direction, each of which has a plurality of cells arranged in the horizontal direction. In FIG. 2B, the first domain 203 is a polarization array while the second and third domains 204, 205 are phase arrays. The optical characteristics of the LCOS phase array 105 illustrated in FIG. 2B will be explained below with reference to FIG. 3A.

The multi-domain LCOS phase array illustrated in FIG. 2C also has three domains, namely, a first domain 206 whose rubbing direction is 45° with respect to the horizontal direction, a second domain 207 whose rubbing direction is 90° with respect to the horizontal direction, and a third domain 208 whose rubbing direction is 0° with respect to the horizontal direction, each of which has a plurality of cells arranged in the horizontal direction. The optical characteristics of the LCOS phase array 105 illustrated in FIG. 2C will be explained below with reference to FIG. 3B. In FIG. 2C, the first domain 206 is a polarization array while the second and third domains 207, 208 are phase arrays.

Figure 3A:
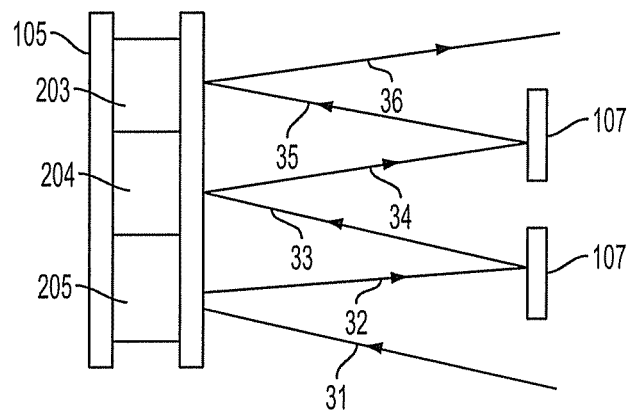
FIG. 3A schematically illustrates a path of a beam incident to the LCOS phase array shown in FIG. 2B.
Figure 3B:
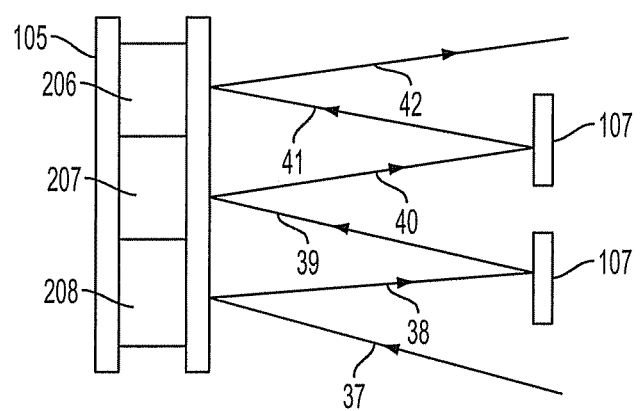
FIG. 3B schematically illustrates a path of a beam incident to the LCOS phase array shown in FIG. 2C.

FIG. 3A schematically illustrates a path of a beam incident to the LCOS phase array shown in FIG. 2B; and FIG. 3B schematically illustrates a path of a beam incident to the LCOS phase array shown in FIG. 2C.

Referring to FIG. 3A, the beams 31 incident to the third domain 205, having a 0° rubbing direction, are output 32 with an output angle, which is slightly different from the incident angle, to the reflective element 107 due to the phase difference caused by the third domain 205. Next, the reflective element 107 reflects the input beams 32 to the second domain 204, having a 0° rubbing direction. The incident beams 33 to the second domain 204 are output 34 from the second domain 204 with an output angle slight different from the incident angle due to the phase difference caused by the second domain 204. The beams 35 reflected from the reflective element 107 are directed to the first domain 203 having a 45° rubbing direction. The beams 36 output from the first domain 203 experience attenuation in their intensity since the first domain 203 changes the polarization of the beams but reduce their intensity by passing through polarizing component located at output fiber for the polarization diversity purpose.

The LCOS phase array 105 illustrated in FIG. 3B is similar to the array shown in FIG. 3A, except that its second domain 207 has a 90° rubbing direction with respect to the horizontal direction, rather than having a 0° rubbing direction as in the second domain shown in FIG. 3A. By using this arrangement, need for polarization diversity is removed.

Figure 4:
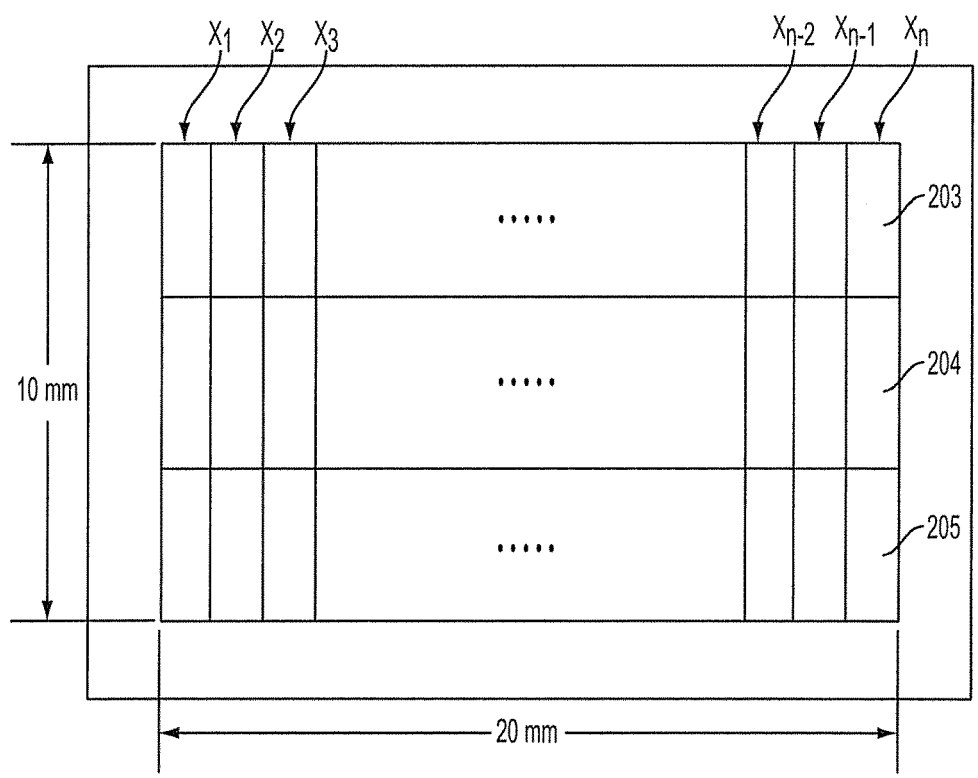
FIG. 4 is a detailed front view of an LCOS phase array of FIG. 2B.

FIG. 4 is a detailed front view of an LCOS phase array of FIG. 2B. In FIG. 4, each of the first, second, and third domains 203-205 includes n cells $\lambda_1$-$\lambda_n$. Typically, the number n may be 2,000, and the length and width of the cells array are 10 mm×20 mm.

In accordance with the constitutions discussed above, accurate control of the output angle of the beams can be realized. In addition, since the present subject matter utilizes a polarization mode in the attenuation domain, any crosstalk between the domains, which happened when adopting conventional phase mode attenuation, can be prevented.

Although a few embodiments of the present subject matter have been shown and described, it would be appreciated by those skilled in the art that changes may be made in this embodiment without departing from the principles and spirit of the present subject matter, the scope of which is defined in the claims and their equivalents.

What is claimed is:

1. A wavelength selective switch (WSS) apparatus comprising:
   a liquid crystal on silicon (LCOS) phase array configured for selectively diverting a certain wavelength component of light beams to continue to propagate and keeping another wavelength component of the light beams from propagating by controlling a voltage applied thereto and/or a polarization of the light beams, the LCOS phase array being provided with a first liquid crystal (LC) domain, a second liquid crystal (LC) domain, and a reflection component, the reflection component being configured to reflect a light beam input through the first LC domain back to the first LC domain and reflect a light beam input through the second LC domain back to the second LC domain; and
   a reflective element that is spaced from the LCOS phase array and arranged to reflect the light beams output from the LCOS phase array back to the LCOS phase array,
   wherein the LCOS phase array includes a substrate on which rubbing directions are provided, the first LC domain having a first rubbing direction and the second LC domain having a second rubbing direction that is different from the first rubbing direction.

2. The WSS apparatus in accordance with claim 1, wherein the first LC domain is configured to change a polarization of light beams through the course of the input of the light beams to the first LC domain, the reflection of the light beams by the reflection component, and the output of the light beams from the first LC domain, and wherein the second LC domain is configured to maintain a polarization of light beams through the course of the input of the light beams to the second LC domain, the reflection of the light beams by the reflection component, and the output of the light beams from the second LC domain.

3. The WSS apparatus in accordance with claim 2, wherein the first LC domain includes first liquid crystals that are oriented in a first direction and the second LC domain includes second liquid crystals that are oriented in a second direction, the second direction being different from the first direction.

4. The WSS apparatus in accordance with claim 3, wherein the second direction is substantially in line with the polarization of the light beams input to the second LC domain and the first direction is substantially 45° with respect to the second direction.

5. The WSS apparatus in accordance with claim 3, wherein the first direction of the first liquid crystals and the second direction of the second liquid crystals are substantially in line with the first rubbing direction of the first LC domain and the second rubbing direction of the second LC domain, respectively.

6. The WSS apparatus in accordance with claim 2, wherein the LCOS phase array further comprises: a third liquid crystal (LC) domain provided between the first and second LC domains, the third LC domain including third liquid crystals that are oriented in a third direction, the third direction being substantially the same as the second direction, wherein the reflection component is further configured to reflect a light beam input through the third LC domain back to the third LC domain.

7. The WSS apparatus in accordance with claim 2, wherein the LCOS phase array further comprises: a third liquid crystal (LC) domain provided between the first and second LC domains, the third LC domain including third liquid crystals that are oriented in a third direction, the third direction being different from the first and second directions, wherein the reflection component is further configured to reflect a light beam input through the third LC domain back to the third LC domain.

8. The WSS apparatus in accordance with claim 7, wherein the third direction is substantially 90° with respect to the second direction.

9. The WSS apparatus in accordance with claim 1, further comprising: a grating element that is located before the LCOS phase array with respect to input light beams and located after the LCOS phase array with respect to output light beams, the grating element being configured to disperse wavelength components of the input light beams in a same plane.

10. The WSS apparatus in accordance with claim 9, further comprising: a plurality of optical fibers from which the input light beams are propagated to the grating element and to which the output light beams are propagated from the grating element.

11. The WSS apparatus in accordance with claim 10, wherein the plurality of optical fibers are arranged so that different wavelength components of the output light beams enters into different optical fibers.

12. The WSS apparatus in accordance with claim 1, wherein each of the first LC domain and second LC domain in the LCOS phase array includes multiple LC cells.

13. The WSS apparatus in accordance with claim 10, further comprising:
 a beam expansion member on a light path between the plurality of optical fibers and the grating element, the beam expansion member being configured for expanding light beams therethrough;
 a first focusing member on a light path between the grating element and the LCOS phase array, the first focusing member being configured for focusing light beams therethrough; and
 a second focusing member on a light path between the LCOS phase array and the reflective element, the second focusing member being configured for focusing light beams therethrough.

14. The WSS apparatus in accordance with claim 1, wherein the reflective element is further arranged to reflect the light beams output from the second LC domain of the LCOS phase array to the first LC domain of the LCOS phase array.

15. A wavelength selective switch (WSS) apparatus comprising:
 a liquid crystal on silicon (LCOS) phase array configured for selectively diverting a certain wavelength component of light beams to continue to propagate and keeping another wavelength component of the light beams from propagating by controlling a voltage applied thereto and/or a polarization of the light beams, the LCOS phase array being provided with a first liquid crystal (LC) domain, a second liquid crystal (LC) domain, and a reflection component, the reflection component being configured to reflect a light beam input through the first LC domain back to the first LC domain and reflect a light beam input through the second LC domain back to the second LC domain; and
 a reflective element that is spaced from the LCOS phase array and arranged to reflect the light beams output from the LCOS phase array back to the LCOS phase array, regardless of a polarization of the light beams.

16. The WSS apparatus in accordance with claim 15, further comprising:
 a beam expansion member on a light path between the plurality of optical fibers and the grating element, the beam expansion member being configured for expanding light beams therethrough;
 a first focusing member on a light path between the grating element and the LCOS phase array, the first focusing member being configured for focusing light beams therethrough; and
 a second focusing member on a light path between the LCOS phase array and the reflective element, the second focusing member being configured for focusing light beams therethrough.

17. The WSS apparatus in accordance with claim 15, wherein the first LC domain is configured to change a polarization of light beams through the course of the input of the light beams to the first LC domain, the reflection of the light beams by the reflection component, and the output of the light beams from the first LC domain, and wherein the second LC domain is configured to maintain a polarization of light beams through the course of the input of the light beams to the second LC domain, the reflection of the light beams by the reflection component, and the output of the light beams from the second LC domain.

18. The WSS apparatus in accordance with claim 17, wherein the first LC domain includes first liquid crystals that are oriented in a first direction and the second LC domain includes second liquid crystals that are oriented in a second direction, the second direction being different from the first direction.

19. The WSS apparatus in accordance with claim 15, wherein the first LC domain has a first rubbing direction and the second LC domain has a second rubbing direction, the first rubbing direction being different from the second rubbing direction.

20. A method of wavelength selective switching of light beams, comprising:

transmitting a light beam from a plurality of optical fibers to a liquid crystal on silicon (LCOS) phase array, the LCOS phase array including a first liquid crystal (LC) domain and a second liquid crystal (LC) domain;

reflecting the light beam by the second LC domain of the LCOS phase array to a reflective element that is spaced from the LCOS phase array, a polarization of the light beam remaining unchanged after the reflection by the second LC domain of the LCOS phase array;

reflecting the light beam by the reflective element back to the LCOS phase array;

reflecting the light beam reflected from the reflective element back to the reflective element, by the first LC domain of the LCOS phase array, the polarization of the light beam being changed after the reflection by the first LC domain of the LCOS phase array; and reflecting the light beam reflected from the first LC domain of the LCOS phase array by the reflective element, regardless of a polarization of the light beams.

\* \* \* \* \*